United States Patent [19]

England

[11] Patent Number: 5,004,528
[45] Date of Patent: Apr. 2, 1991

[54] METHOD AND APPARATUS FOR ELECTRO CHEMICAL MACHINING

[75] Inventor: David R. England, Bristol, England

[73] Assignee: Rolls-Royce plc, London, England

[21] Appl. No.: 473,734

[22] Filed: Feb. 2, 1990

[30] Foreign Application Priority Data

Feb. 14, 1989 [GB] United Kingdom ............... 8903275

[51] Int. Cl.$^5$ .............................................. B23H 3/02
[52] U.S. Cl. ............................. 204/129.2; 204/224 M; 204/228
[58] Field of Search ............... 204/129.2, 224 M, 228

[56] References Cited

U.S. PATENT DOCUMENTS

| | | | |
|---|---|---|---|
| 3,533,927 | 10/1970 | Manning | 204/129.2 |
| 3,652,440 | 3/1972 | Dehner | 204/129.2 X |
| 3,714,005 | 1/1973 | Drushel | 204/228 X |
| 4,134,807 | 1/1979 | Brifford | 204/224 M X |
| 4,487,671 | 12/1984 | McGeough | 204/224 M X |
| 4,545,874 | 10/1985 | England | 204/224 M X |
| 4,672,161 | 6/1987 | Inoue | 204/224 M X |
| 4,720,616 | 1/1988 | Inoue | 204/224 M X |
| 4,806,719 | 2/1989 | Seerieder et al. | 204/224 M X |

FOREIGN PATENT DOCUMENTS 2082856 3/1982 United Kingdom .

Primary Examiner—Donald R. Valentine
Attorney, Agent, or Firm—Oliff & Berridge

[57] ABSTRACT

In the operation of an electro chemical machine, damage can occur if there is direct electrical contact between the workpiece and the machine tool. Such contact causes a rise in machining current, and to detect this, signals representing the current are fed in a series of successive time periods to two peak detectors (34,36) alternately. The maximum value of the current in one period, detected by one peak detector (34,36), is compared by a differential amplifier (42) with the maximum value of the current detected by the other peak detector (34,36) in an immediately succeeding time period. If the difference, corresponding to a rise in current, exceeds a predetermined threshold value, determined by a window detector 46, a relay 48 is operated to disable the electro chemical machine.

5 Claims, 4 Drawing Sheets

METHOD AND APPARATUS FOR ELECTRO CHEMICAL MACHINING

The present invention relates to electro chemical machining. In electro chemical machining, machining occurs when an electrolyte bridges a gap between a workpiece anode and a tool cathode, and an electro field is set up in the gap. The present invention is particularly concerned with disabling of the electro chemical machine tool, and is concerned with both method and apparatus aspects.

In our U.S. Pat. No. 4545874, we discuss a method of disabling an electro chemical machine tool by detecting arcing between the workpiece and the tool. In U.S. Pat. No. 4545874, the machining voltage was monitored to detect the noise generated by sparks, and operated such that if sparking persisted for at least as long as a predetermined delay period, a trip circuit was operated to interrupt the machining current.

There are situations, however, where defects in the electro machining operation would not be detected by the system of U.S. Pat. No. 4545874 because no spark is generated. For example, if there is blockage of electrolyte flow, or passivation, then there may be direct electrical contact between the workpiece and the tool. A current flows with little or no sparking, and hence little or no electrical noise is produced to be detected by the system of U.S. Pat. No. 4545874. When such contact occurs, the machining current is concentrated at the point of contact, and this can cause damage. If this concentrated current due to contact is allowed to persist, the tool and workpiece at the point of contact will become heated, and this will continue until material is blown aside from the point of contact. This breaks the contact, and generates sparks whose noise can be detected by the system of U.S. Pat. No. 4545874, but by then it is too late, and the damage has occurred.

The present invention, therefore, seeks to provide a system in which such contact current can be detected.

At its most general, the present invention proposes that current maximas in successive time periods be compared, to detect if there is a rise in the current. If contact occurs, there is a momentary surge of the machining current, and this can then be detected. Once the surge has been detected, the machining can be halted.

Thus, in a first aspect, the present invention may provide an apparatus for disabling an electro chemical machine tool, comprising means for monitoring current fed to the machine tool, the monitoring means being adapted to operate in a series of successive time periods, means for detecting the maximum value of the current for each time period; means for comparing the maximum value of the current for each of at least some of those time periods with the maximum value of the current for a respective successive time period, the comparison means being adapted to determine the current difference between the compared maximum values of the current; and means for disabling the electro chemical machine when the current difference is greater than a predetermined value.

Furthermore, in a second aspect of the present invention, there may be provided a method of disabling an electro chemical machine tool comprising: monitoring, in a series of successive time periods, current fed to the machine tool; detecting the maximum value of the current for each time period; comparing the maximum value of the current for each of at least some of the time periods with the maximum value of the current for a respective successive time period, to obtain a current difference; and disabling the electro chemical machine when the current difference is greater than a predetermined value.

If the machining current is smooth, the time duration of each time period may be short. In practice, however, there is usually a ripple on the current imposed by its rectification, and therefore the duration of each time period must be long enough to include at least one, preferably several, such ripples so that the operation is not influenced by the normal variations in the current.

With the present invention, as discussed above, any increase in maximum current value will be detected. To ensure that minor current variations of no significance, do not cause the electro chemical machine to be disabled, there is a threshold value of such variations, below which the variations are ignored. Of course, this threshold may be adjustable depending on the sensitivity required.

Normally, although this is not essential, the maximum current value of one time period will be compared with the maximum current value of the immediately succeeding time period, and this is repeated from one time period to the next. To do this, a pair of peak detectors may be provided, which receive a signal corresponding to the machining current for alternate time periods. Each peak detector stores the maximum value of the current through a subsequent (normally the immediately subsequent) time period, so that the value it stores may be compared with the value detected by the other peak detector during that subsequent time period, which is then stored to be compared with the maximum value detected by the first peak value detector during a further time period.

It should be noted that the present invention may be used in conjunction with a spark detector as disclosed in U.S. Pat. No. 4545874.

An embodiment of the present invention will now be described in detail, by way of example, with reference to the accompanying drawings, in which.

Figure 1:
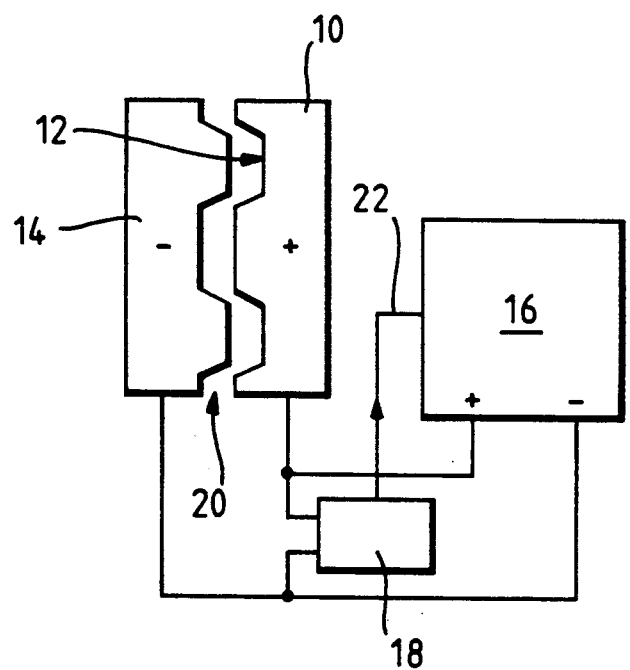
FIG. 1 is a diagrammatic view of an electro chemical machine tool in accordance with the present invention.

Referring first to FIG. 1, a workpiece 10 is worked by electro chemical machining to have a surface with a shape 12, by an appropriately shaped machine tool electrode 14. A power supply unit 16 provides the electrical power necessary to achieve a machining action, and the machining operation may be a standard one.

An apparatus 18 according to the present invention for disabling the electro chemical machine tool is connected so that the apparatus 18 detects the current supplied by the power supply to the workpiece 10 and the machining electrode 14. As will be discussed in more detail later, when changes in this current occur, corresponding to direct electrical contact between the workpiece 10 and the machining electrode 14 across the gap 20, the apparatus 18 generates a signal on line 22 to disable the machine tool. It should be noted that FIG. 1 corresponds to FIG. 1 of U.S. Pat. No. 4545874, and indeed an apparatus according to that disclosure may be provided in conjunction with the apparatus 18.

The apparatus 18 of FIG. 1 will now be discussed in detail with reference to FIG. 2. -n the apparatus 18 shown in FIG. 2, a signal representing the machining current is received via the apparatus 18 via a line, and amplified by an amplifier 32. The output of that amplifier 32 is supplied to two peak detectors 34,36, but the processing of the signal received by those peak detectors 34,36 is controlled by an oscillator 38. That oscillator 38 triggers gates so that the peak detector 34 processes a signal from the amplifier 32 for a first time period, then the oscillator operates to cause the second peak detector 36 to process the signal from the preamplifier 32 for a second time period, and then the processing is returned to the first peak detector 34, and this cycle repeats.

In each cycle of processing, each peak detector 34 operates to detect the maximum value of the current during that time period. Normally, the electro chemical machine is operated by a power supply which produces rectified unsmoothed D.C. due to either a thyristor or saturable reactor rectifier, and so there is a ripple on the current. The action of the oscillator 38 must therefore allow each peak detector 34,36 to act over at least one full cycle of the ripple, and in practice several cycles are used. Thus, if there is a 3.3 ms variation in the ripple, a 20 ms time period generated by the oscillator 38 will cause each peak detector to act over 6 ripple cycles for each time period.

Suppose now that the oscillator 38 operates to cause the output of the preamplifier 32 to be fed to the first peak detector 34 for a first time period. During that time period, the peak detector 34 detects a maximum value of the current and outputs signal on line 40 representing that maximum to a differential amplifier 42. At the end of the time period, the maximum value is not lost but is stored so that the signal remains on line 40 through the next time period. During that next time period, the maximum value of the current is detected by the second peak detector 36 which outputs a signal representing that maximum on line 4., which also passes to the differential amplifier. At that time, therefore, the signals on lines 40 and 44 respectively represent the maximum values of the current for two successive time periods. It is therefore possible for the differential amplifier 42 to detect whether there has been a change in the maximum value of the current. For the next time period, the maximum value of the current is detected by the first peak detector 34 and thus the successive maximum values are now on lines 44 and 40 respectively.

As was discussed above, electrical contact between the workpiece 10 and the tool electrode 14 causes a rise in current, and thus will be detected as a difference between the maximum current detected in one time period, the maximum current detected in another. It should be noted that the sign of this difference will change. This can be seen from consideration of FIG. 2, and assuming the differential amplifier operates to subtract the signal on line 40 from that on line 44. In one cycle, where the second peak detector 36 is receiving the signal, and the maximum value of the current is compared with the maximum value of the current in the preceding time period, as determined by the first peak detector 34, then any change in current will result in a positive output from the differential amplier 42. However, for the next time period, any increase in current will result in the output of the first peak detector 34 being larger than the output of the second peak detector 36 so that the difference results in a negative output from the differential amplifier 42.

The output of the differential amplifier 42 is passed to a window detector 46, which is to detect whether the increase in current exceeds a threshold value. The window detector 46 must detect both positive and negative variations and therefore the threshold is set as positive and negative values about zero. Differences in that threshold value below a suitable level are ignored as being of no significance, thus, for example, the window detector 46 may detect when the output from the differential amplifier exceeds +2V or is less than −2V. It should also be noted that the levels imposed by the window detector 46 may be adjustable, to adjust the sensitivity of the system.

If the window detector 46 detects that the threshold has been exceeded, it generates a signal to a switch 48 which disables the electro chemical machine. Normally, this switch 48 will be a suitable relay. FIG. 2 also shows the power supply 50 for the apparatus 18.

Figure 2:
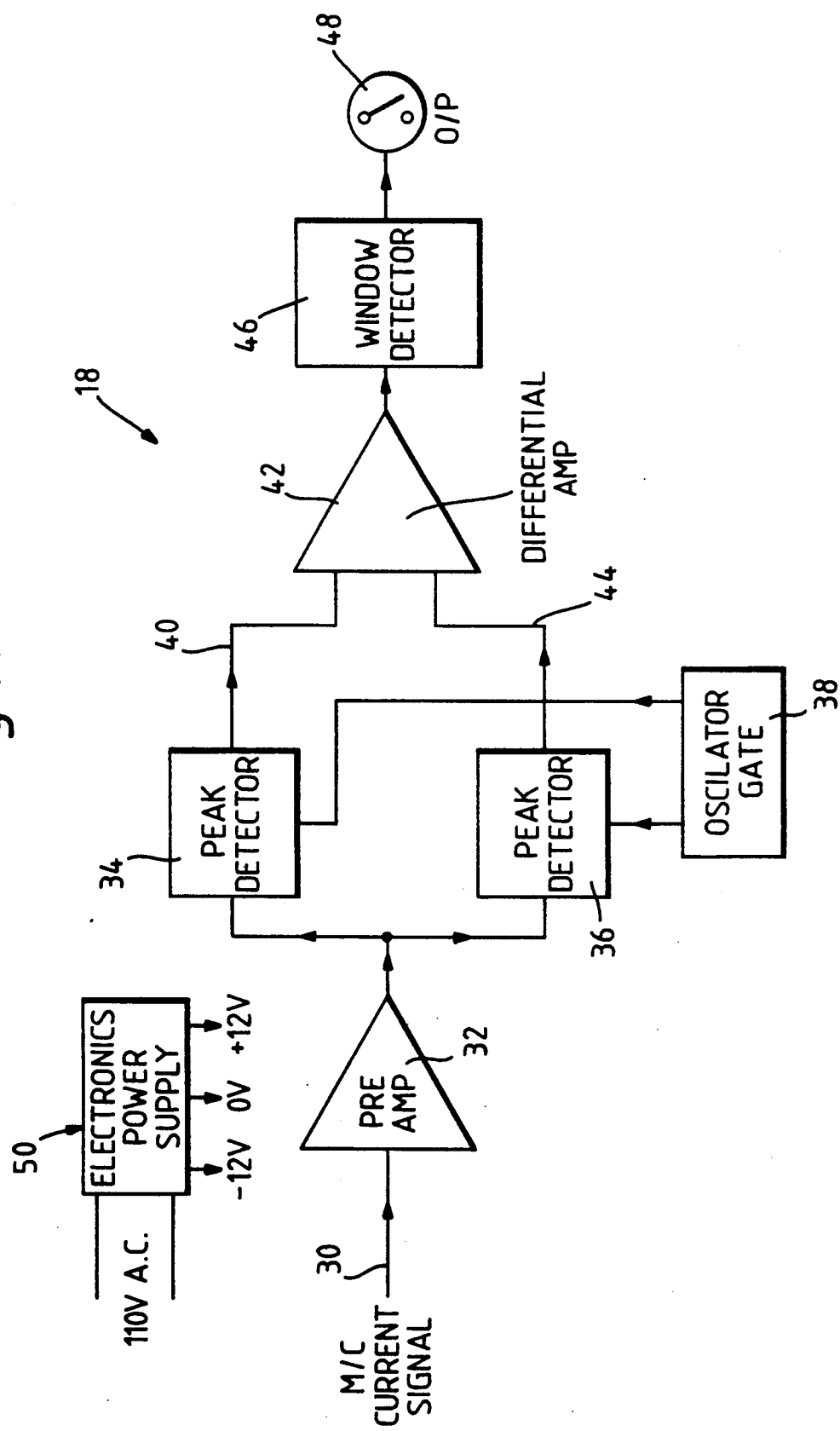
FIG. 2 shows a block diagram of an apparatus for disabling the electro chemical machine tool.
Figure 3:
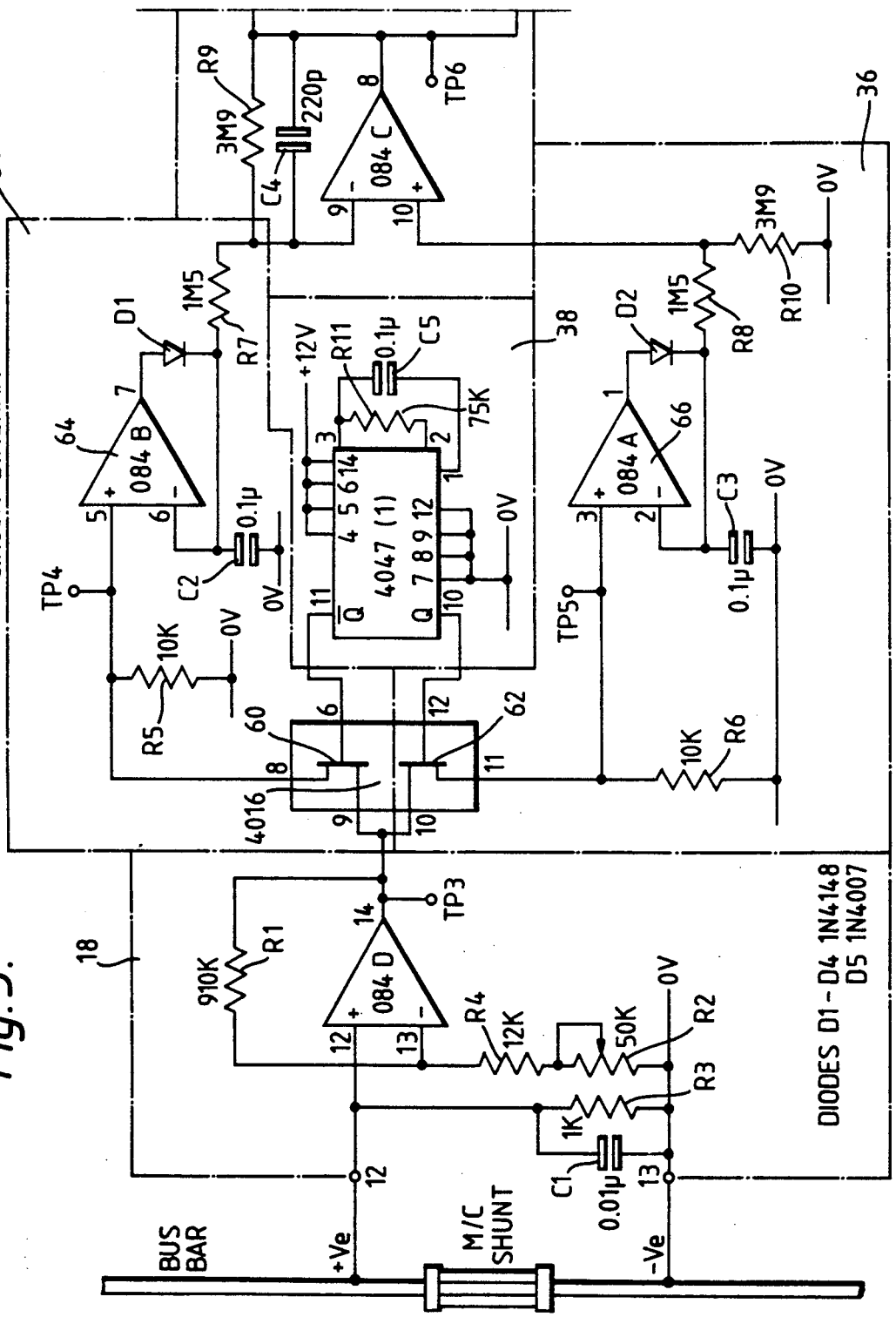
FIG. 3 shows a circuit diagram of the apparatus for FIG. 2.
Figure 3:
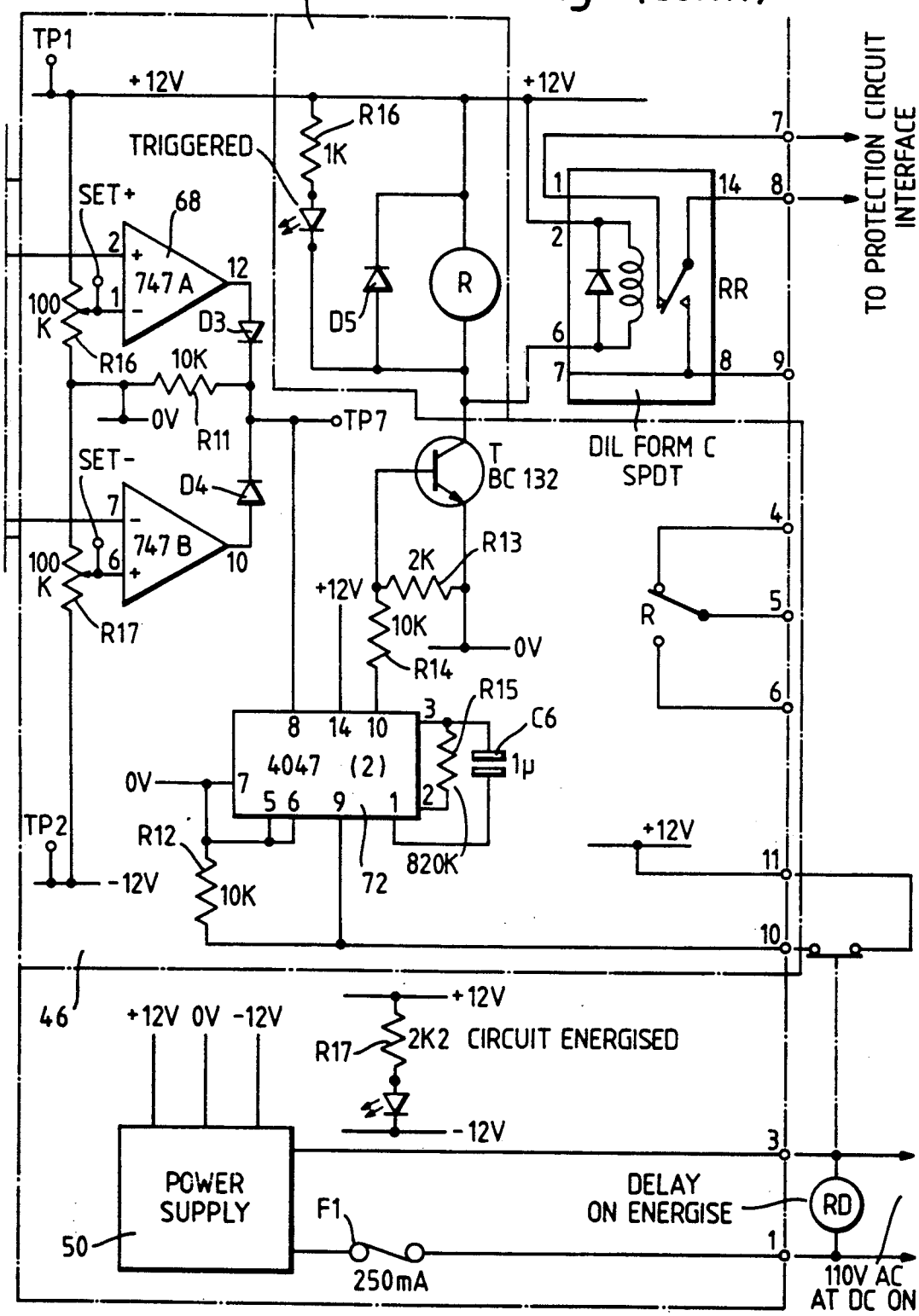

FIG. 3 shows a more detailed circuit diagram of the apparatus of FIG. 2. The circuit components of this circuit are, individually, conventional and the manufacture and operation of the circuit shown in FIG. 3 will be immediately understandable to a person skilled in the art. However, there are some features worth noting in more detail.

It can be seen from FIG. 3 that the action of the oscillator 38 is to control gates 60.62 which control the inputs to the operational amplifier 64,66 of the peak detectors 34,36 respectively. These operational amplifiers 64,66 will have equal decay times, so that the falling current will produce similar effects in each. FIG. 3 also shows the structure of the window detector 46 in more detail. Operational amplifiers 68,70 are arranged as comparators to detect positive or negative deviation received from the output of the differential amplifier 42. In each case, the signal from the differential amplifier 42 is compared with a trigger level determined by resistances R16,R17 respectively, and signals greater, in a positive direction, or less than, in a negative direction, that threshold value result in a signal being fed to an integrated circuit 72 acting as a monostable, which triggers the relay 48. It can also be seen that the relay 48 has light-emitting diodes which act as a display when the apparatus acts to inhibit the machining.

I claim:

1. An apparatus for disabling an electro chemical machine tool, comprising means for monitoring current fed to the machine tool, the monitoring means being adapted to operate in a series of successive time periods, means for detecting the maximum value of the current for each time period; means for comparing the maximum value of the current for each of at least some of those time periods with the maximum value of the current for a respective successive time period, the comparison means being adapted to determine the current difference between the compared maximum values of the current; and means for disabling the electro chemical machine when the current difference is greater than a predetermined value, wherein the means for detecting the maximum value of the current comprises first and second peak detectors, and means for causing signals representing the current to be supplied to the first and second peak detectors alternately for successive time periods.

2. An apparatus according to claim 1 wherein each peak detector is adapted to store a signal representing the maximum value of the current in one rime period for the duration of an immediately succeeding time period.

3. An apparatus according to claim 1 wherein the predetermined value is variable.

4. An electro chemical machine tool having disabling apparatus according to claim 1.

5. A method of disabling an electro chemical machining tool comprising: monitoring, in a series of successive time periods, current fed to the machine tool; detecting the maximum value of the current for each time period; comparing the maximum value of the current for each of at least some of the time periods with the maximum value of the current for a respective successive time period, to obtain a current difference; and disabling the electro chemical machine when the current difference is greater than a predetermined value, wherein the comparison operation compares the maximum value of the current of each time period with the maximum value of the current in the immediately succeeding time period.

* * * * *